United States Patent
Lee et al.

(10) Patent No.: US 7,127,034 B1
(45) Date of Patent: Oct. 24, 2006

(54) COMPOSITE STATOR

(75) Inventors: David S. K. Lee, Salt Lake City, UT (US); Paul D. Moore, Salt Lake City, UT (US); John E. Postman, Sandy, UT (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 123 days.

(21) Appl. No.: 10/358,937

(22) Filed: Feb. 5, 2003

(51) Int. Cl.
*H01J 35/10* (2006.01)
*H01J 35/00* (2006.01)

(52) U.S. Cl. .................... 378/131; 378/119; 378/121
(58) Field of Classification Search ............... 378/131, 378/119, 125, 132, 141, 143, 144; 310/215, 310/216, 218, 198, 254, 259
See application file for complete search history.

(56) References Cited

U.S. PATENT DOCUMENTS

| | | | |
|---|---|---|---|
| 3,727,302 A * | 4/1973 | Phelon .................... | 29/596 |
| 4,831,300 A * | 5/1989 | Lindgren .................... | 310/190 |
| 5,654,999 A * | 8/1997 | Gemmel et al. ............ | 378/132 |
| 6,198,803 B1 * | 3/2001 | Osama et al. ................ | 378/132 |
| 6,313,555 B1 * | 11/2001 | Blumenstock et al. ..... | 310/90.5 |
| 6,449,339 B1 * | 9/2002 | Yasutake .................... | 378/144 |
| 6,570,960 B1 * | 5/2003 | Kuzniar et al. ............. | 378/125 |
| 6,594,340 B1 * | 7/2003 | Saito .......................... | 378/130 |
| 6,727,623 B1 * | 4/2004 | Horst et al. ............ | 310/156.57 |
| 6,749,337 B1 * | 6/2004 | Artig et al. .................. | 378/203 |
| 6,809,442 B1 * | 10/2004 | Kaneko et al. ............... | 310/58 |
| 6,880,229 B1 * | 4/2005 | Zepp et al. ................... | 29/596 |
| 2003/0052567 A1 * | 3/2003 | Yonekura .................... | 310/254 |

* cited by examiner

*Primary Examiner*—Edward J. Glick
*Assistant Examiner*—Irakli Kiknadze
(74) *Attorney, Agent, or Firm*—Workman Nydegger

(57) ABSTRACT

A composite stator is disclosed for use with rotationally driven apparatus, particularly high voltage x-ray tubes. The composite stator generally comprises a core, a plurality of motor windings, and a retaining band. The core is comprised of two or more core sections having slots defined therein for receiving the motor windings. The motor windings are wound through and between the slots of the core sections, after which the core sections are joined together to form the core. The core sections are maintained in an assembled configuration by the retaining band. The motor windings are interconnected to comprise the electromagnetic pole pairs of the composite stator, thereby allowing the stator to induce the rotation of the rotor assembly of the high voltage x-ray tube.

30 Claims, 8 Drawing Sheets

COMPOSITE STATOR

BACKGROUND OF THE INVENTION

1. The Field of the Invention

The present invention generally relates to stators. More particularly, the present invention relates to a composite stator for use in rotationally driven systems, such as rotary anode x-ray generating devices.

2. The Related Technology

X-ray generating devices are extremely valuable tools that are used in a wide variety of applications, both industrial and medical. For example, such equipment is commonly employed in areas such as medical diagnostic examination, therapeutic radiology, semiconductor fabrication, and materials analysis.

Regardless of the applications in which they are employed, most x-ray generating devices operate in a similar fashion. X-rays are produced in such devices when electrons are emitted, accelerated, then impinged upon a material of a particular composition. This process typically takes place within an x-ray tube located in the x-ray generating device. The x-ray tube generally includes a vacuum enclosure comprising a cylindrical top section having a specified diameter, and a bottom cylindrical section having a smaller diameter. The top end bottom sections are hermitically sealed together to enable a vacuum to be maintained therein.

The vacuum enclosure has disposed therein a cathode and an anode. The cathode includes a filament that, when heated via an electrical current passing through it, emits a stream of electrons. The anode typically comprises a graphite substrate upon which is disposed a heavy metallic target surface that is oriented to receive the electrons emitted by the cathode. Though some x-ray tube anodes are stationary, many are rotatably supported within the vacuum enclosure by a rotor assembly.

A rotor assembly typically comprises a rotor shaft, a rotor hub and sleeve, and a bearing assembly. One end of the rotor shaft rotatably supports the rotary anode, while the other end is attached to the rotor hub and sleeve. The hub interconnects the rotor shaft and the rotor sleeve with the bearing assembly, thereby enabling the shaft and sleeve to rotate. The rotor sleeve is rotationally and concentrically disposed about a substantial portion of the bearing assembly.

The rotor assembly and anode are rotated by a stator. The stator, which generally comprises a hollow cylindrical core and a plurality of integrated wire coil windings, is circumferentially disposed about a portion of the exterior of the vacuum enclosure such that it is proximate the rotor sleeve disposed within the vacuum enclosure. When energized by a single or multi-phase electric current, the coil windings of the stator induce rotation of the rotor sleeve by way of electromagnetic induction. In this way, the anode, being connected to the rotor sleeve via the rotor shaft is rotated during operation of the x-ray tube.

In order for the x-ray tube to produce x-rays, an electric current is supplied to the cathode filament of the x-ray tube, causing it to emit a stream of electrons by thermionic emission. A high voltage potential placed between the cathode and the anode causes the electrons in the electron stream to gain kinetic energy and accelerate toward the target surface located on the anode. Upon striking the target surface, many of the electrons convert their kinetic energy into electromagnetic radiation of very high frequency, i.e., x-rays. The specific frequency of the x-rays produced depends in large part on the type of material used to form the anode target surface. Target surface materials having high atomic numbers ("Z numbers"), such as tungsten or TZM (an alloy of titanium, zirconium, and molybdenum) are typically employed. Finally, the x-ray beam passes through a window defined in the vacuum enclosure and is directed to an x-ray subject, such as a medical patient.

One common variety of x-ray tube employing a rotary anode is known as a double-ended x-ray tube. Double-ended x-ray tubes create the high voltage potential necessary to accelerate the electrons produced by the cathode toward the anode by electrically biasing both the cathode and the anode with a high negative and high positive voltage, respectively. A typical high power, double-ended x-ray tubes may electrically bias the anode and cathode with a relative voltage as high as 150 kV or more during tube operation.

Because typical high power, double-ended x-ray tubes operate with such high voltages, the use of insulating structures supportably connecting the anode and cathode to the vacuum enclosure is necessary to electrically isolate them from the rest of the tube. These insulating structures are typically composed of an electrically insulative material, such as glass or ceramic, and must isolate the high voltage present at the anode and cathode so that the vacuum enclosure and other parts of the tube are maintained at low voltage ground potential.

In the case of the rotary anode, an anode insulator is disposed between the rotor assembly and the bottom section of the vacuum enclosure. In addition to structurally supporting the anode via the rotor assembly, the anode insulator electrically isolates it, as explained above. The anode insulator comprises a ceramic disk having a central bore in which a portion of the bearing assembly of the rotor assembly is disposed. The anode insulator is disposed at the lower end of the bottom section of the vacuum enclosure, thereby comprising the circular bottom surface of the enclosure.

Because of the high voltage that must be isolated, the anode insulator must comprise at least a minimum dimension in order for it to properly isolate the anode and the attached rotor assembly. For instance, in a 150 kV double ended x-ray tube, the ceramic disk comprising the anode insulator typically has a minimum outside diameter of about 3.5 inches. Accordingly, the outside diameter of the bottom section of the vacuum enclosure bottom section must be at least about 3.5 inches.

Unfortunately, the minimum size requirement of the disk-shaped anode insulator creates other problems. For example, during manufacture of the x-ray tube, the top and bottom sections of the vacuum enclosure are joined by a high heat brazing process involving temperatures exceeding 400° Celsius. Because a typical stator comprises components that are able to withstand temperatures only up to about 220° Celsius, the stator must be joined to the vacuum enclosure only after the top and bottom sections of the enclosure have been joined. The joining of the stator to the vacuum enclosure is typically accomplished by sliding the hollow cylindrical stator over the end of the bottom section of the vacuum enclosure until it is disposed adjacent the rotor sleeve of the rotor assembly, where it is then secured. However, in order to be able to clear the circular anode insulator, which comprises the bottom surface of the bottom section of the vacuum enclosure, the inside diameter of the hollow cylindrical stator must be greater than the outside diameter of the anode insulator. Thus, the inside diameter of the typical stator is limited by the outside diameter of the anode insulator.

This limitation on the inside diameter of the typical stator is problematic. In order to cause the rotor sleeve to spin, the inside diameter of the stator must be as close as possible to the outside diameter of the rotor sleeve in order for inductive coupling between the two components to occur. Because the inside diameter of a typical stator disposed in a high power, double-ended tube must be large in order to fit over the bottom section of the vacuum enclosure, it does not enable inductive coupling with a standard-sized rotor sleeve commonly found in x-ray tubes. Thus, rotor sleeves having larger diameters must be specially manufactured for use in such high power x-ray tubes in order to provide the stator-to-sleeve proximity required to rotate the rotor assembly and anode. This in turn translates into increased expense in manufacturing and assembling the x-ray tube.

In addition to the above, other problems are created by the large diameter anode insulator, rotor sleeve, and stator. For example, the junction between the top and bottom sections of the vacuum enclosure must define a larger diameter aperture in order to accommodate insertion of the enlarged rotor sleeve into the vacuum enclosure during assembly of the x-ray tube. Unfortunately, this also creates an enlarged direct thermal path through which heat from the anode may be directly radiated to portions of the rotor assembly and bearing assembly during tube operation. Because the bearing assembly is especially heat sensitive and may be easily damaged if subjected to excessive amounts of heat, the increased radiative heat transfer created by the enlarged vacuum enclosure aperture is especially problematic.

In light of the above, a need exists to avoid the problems created by the design of high power, double-ended x-ray tubes necessitated by the high voltages present therein. Specifically, a need exists for a stator that can enable the above-described problems to be overcome not only in x-ray tubes, but in other rotationally-driven apparatus.

BRIEF SUMMARY OF THE INVENTION

The present invention has been developed in response to the above and other needs in the art. Briefly summarized, embodiments of the present invention are directed to a composite stator that is assembled to operate as a complete stator. One application where such a stator may be utilized is in high voltage double-ended x-ray tubes, where it is desirable to minimize the distance between the rotor sleeve and the stator.

In a first embodiment, the composite stator generally comprises first and second core sections that together form the stator core, and a plurality of wound wire coils forming stator windings. At least one winding each is wound in a specified pattern around each of the core sections through longitudinally defined slots in the respective core section. The first and second core sections, preferably comprising steel or similar metal, are then mated to form a hollow cylindrical stator core. The core sections are held together through any suitable fastener, such as a non-magnetic metal band. The discrete stator windings of each core section are then interconnected to comprise the stator windings, which define electromagnetic poles when the stator is operational.

The present invention enables the placement of the composite stator in locations not before possible. For instance, the first and second composite stator core sections could be matingly disposed about the bottom section of the vacuum enclosure of a high power, double-ended x-ray tube. This portion of the bottom section of the vacuum enclosure could be designed to have a smaller diameter than the anode insulator disposed near the bottom of the bottom section of the enclosure. This, in turn, allows the composite stator to have a smaller inside diameter than what would otherwise be possible because the composite stator would not have to be slid over the large diameter anode insulator at the end of the bottom section of the vacuum enclosure. Thus, the composite stator may be disposed in close proximity to the rotor sleeve in the bottom section of the vacuum enclosure as is desired. This, then, enables a standard-sized rotor sleeve having a nominal outside diameter to be utilized in the rotor assembly.

Because standard rotor sleeves can be utilized in double-ended tubes employing the present composite stator, significant time and cost savings can be realized when compared to the cost and time involved in manufacturing a special rotor sleeve. Further, the use of a standard rotor sleeve in the x-ray tube enables the aperture defined by the junction between the top and bottom sections of the x-ray tube vacuum enclosure to be smaller. This in turn reduces direct radiative heating from the anode to the bearing assembly and other portions of the rotor assembly, which in turn increases the performance and longevity of these parts. Finally, because the composite stator is smaller than typical single-piece stators for high power x-ray tubes, it allows for better air flow about the vacuum enclosure, thereby enabling better cooling of the enclosure and of the composite stator itself.

In a second embodiment, the composite stator of the present invention comprises a stator core having eight sections. Each core section includes longitudinally extending slots through which windings are disposed. When the discrete, wired core sections are mated to form the hollow cylindrical core, the windings are interconnected to form the poles of the composite stator. Preferably, a composite stator manufactured in accordance with this embodiment is, before complete assembly, disposed around a component, such as the vacuum enclosure and rotor assembly of an x-ray tube, thereby realizing the advantages discussed above in connection with the first embodiment.

These and other features of the present invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale. FIGS. 1–8 depict various features of embodiments of the present invention, which is generally directed to a composite stator for use with rotational apparatus, such as a high power, double-ended x-ray tube. It is noted that words such as top, bottom, upper, lower, and the like are merely descriptive terms that are used to enable a sufficient description to be made of the present invention. Such words, therefore, are not meant to restrict the present invention in any way.

Figure 1:
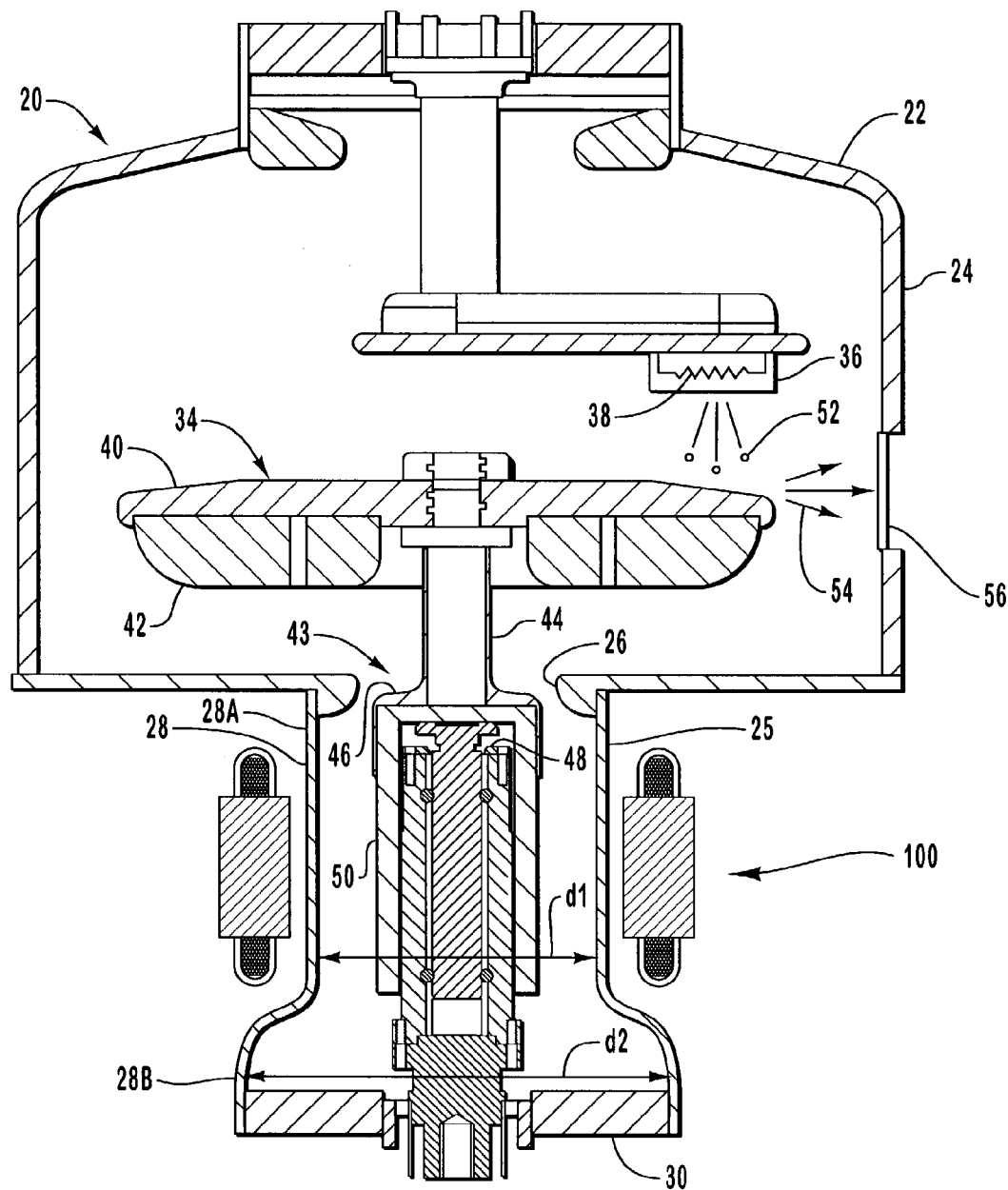
FIG. 1 is a cross sectional side view of a double-ended x-ray tube incorporating various features of a first embodiment of the present invention.

Reference is first made to FIG. 1, which depicts a double-ended x-ray tube 20 incorporating a first embodiment of the composite stator 100. The x-ray tube 20 preferably includes a vacuum enclosure 22 comprising a top section 24 and a bottom section 25. The top section 24 is preferably cylindrical in shape and defines on the bottom thereof an aperture 26. The bottom section 25 of the vacuum enclosure 22 comprises a cylindrical side wall 28 and an insulating disk 30. The side wall 28 defines an upper portion 28A having a first diameter designated in FIG. 1 by d1, and a lower portion 28B having a larger, second diameter indicated in the figure by d2. The top edge of the upper portion 28A is attached to the periphery of the aperture 26 defined by the top section 24. The lower portion 28B of the side wall 28 is attached to the insulating disk 30, which is circular so as to seal the bottom section 25 of the vacuum enclosure.

A rotary anode 34, and a cathode 36 are disposed inside the vacuum enclosure 22. The anode 34 is spaced apart from and oppositely disposed to the cathode 36 to receive electrons emitted by a filament 38 disposed in the cathode. A target surface 40 typically comprising a heavy metallic material is disposed on a graphite substrate 42 of the anode 34.

The anode 34 is rotatably supported by a rotor assembly 43. The rotor assembly 43 includes a rotor shaft 44 that is attached at one end to the anode 34, and at the other end to a rotor hub 46. The rotor hub 46 is rotatably disposed atop a bearing assembly 48. A cylindrical rotor sleeve 50 is also attached to the rotor hub 46 and extends downward around a portion of the bearing assembly 48.

The insulating disk 30 preferably comprises an aluminum oxide ceramic, and includes a central bore defined therethrough for receiving a portion of the bearing assembly 48. In this way, the anode 34 and rotor assembly 43 are supported within the vacuum enclosure. Also, the insulating disk 30 insulates the high voltage anode 34 and rotor assembly 43 from the vacuum enclosure 22 and other parts of the x-ray tube 20. To do this, the insulating disk must possess predetermined dimensions. For instance, in the high power, double-ended tube 20 shown in FIG. 1, which may operate at 150 kV or more, the insulating disk has a outside diameter of about 3.5 inches.

A first embodiment of the composite stator 100 is shown in cross section in FIG. 1. The composite stator 100 is preferably disposed about the upper portion 28A of the vacuum enclosure 22 such that it is adjacent the rotor sleeve 50. The composite stator 100 is used to induce rotation of the rotor sleeve 50, which in turn causes the rotor shaft 44 and anode 34 to rotate during tube operation. Details concerning the composite stator 100 are found further below.

In order for the x-ray tube 20 to produce x-rays, the cathode 36 and the anode 34 are electrically biased such that a high voltage potential is established between them. In this arrangement, the cathode 36 is biased with a high negative voltage while the anode 34 has a high positive voltage. An electric current is then passed through the filament 38, causing a cloud of electrons, designated at 52, to be emitted from the filament by thermionic emission.

An electric field created by the high voltage potential existing between the anode 34 and the cathode 36 causes the electron cloud 52 to accelerate from the cathode toward the target surface 40 of the rotating anode. As they accelerate toward the target surface 40, the electrons 52 gain a substantial amount of kinetic energy. Upon approaching and impacting the anode target surface 40, many of the electrons 52 are rapidly decelerated, thereby converting their kinetic energy into electromagnetic waves of very high frequency, i.e., x-rays. The resulting x-rays, designated at 54, emanate from the anode target surface 40 and are collimated through a window 56 disposed in the vacuum enclosure 22. The collimated x-rays 54 are then directed for penetration into an object, such as an area of a patient's body. As is well known, the x-rays 54 that pass through the object can be detected, analyzed, and used in any one of a number of applications, such as x-ray medical diagnostic examination or materials analysis procedures.

Figure 2:
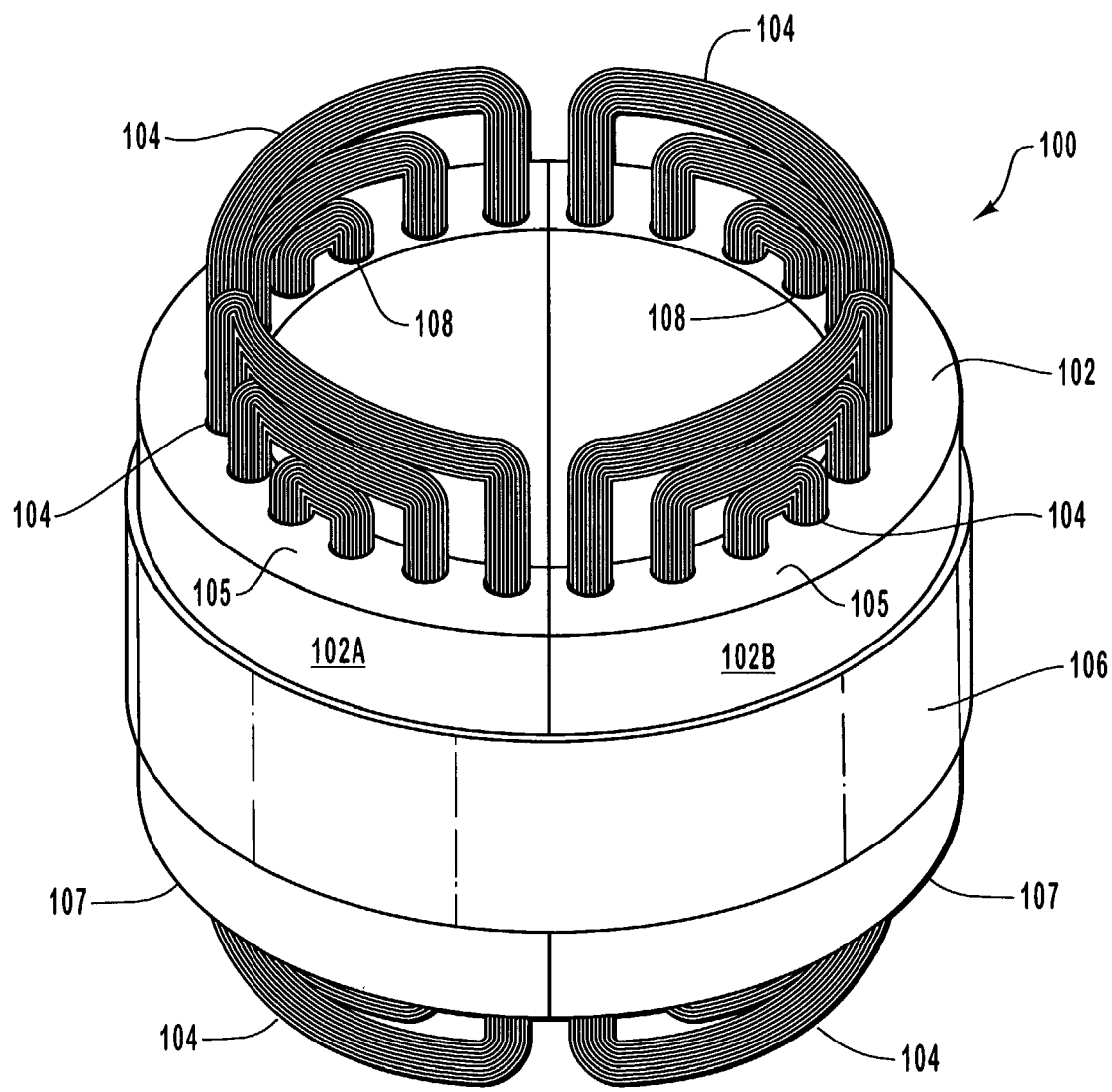
FIG. 2 is a perspective view of the composite stator in accordance with the first embodiment thereof.

Reference is now made to FIG. 2, which depicts various features of a first embodiment of the composite stator 100. As mentioned above, the composite stator 100 utilizes the principle of electromagnetic induction to drive the rotation of the rotor sleeve 50 and the anode 34 during tube operation. To do this, the composite stator must be disposed proximate the rotor sleeve 50 of the rotor assembly 43. The features of the present invention enable the composite stator 100 to be secured proximate the rotor sleeve 50 without encountering problems typical of known stators. As can be seen in FIG. 2, the composite stator 100 generally comprises a core 102, a plurality of core windings 104, which are shown in an expanded view for clarity, and a retaining band 106.

Figure 3:
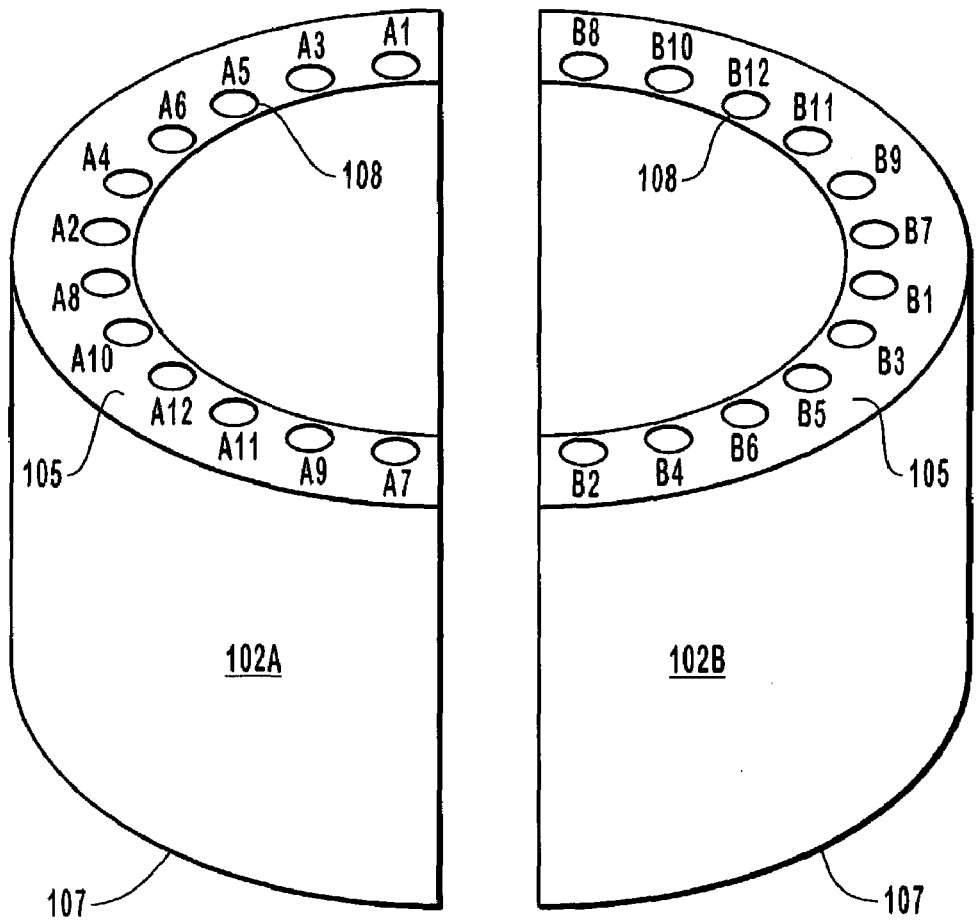
FIG. 3 is an exploded perspective view of the composite stator core in accordance with the first embodiment.

Reference is made to FIG. 3, which depicts the core 102 of a first embodiment of the composite stator 100 in exploded view. The core 102, preferably comprising steel, defines a hollow cylindrical shell and comprises two core sections 102A and 102B, which can be thought of as being defined by an imaginary plane bisecting the core 102 along its longitudinal axis. Each core section therefore comprises half of the core 102. The core sections 102A and 102B may be manufactured a variety of ways, including casting or machining.

Each core section 102A, 102B defines a plurality of slots 108 longitudinally extending through the core section from the top face 105 to the bottom face 107 thereof. Preferably, each core section 102A, 102B defines 12 evenly spaced slots 108, though the slots may number more or less than this as required for the desired stator application. Though shown in FIG. 3 to be fully contained within the body of the core section 102A and 102B, the slots 108 may alternatively be disposed such that they are in at least partial contact with the inner surface of the core sections.

The slots 108 have been designated in FIG. 3 with letter/number identifiers to facilitate description of an example of one wiring scheme used to dispose the core windings 104 about the stator core (see FIG. 2). The core windings 104 each comprise a length of electrically conductive wire that is repeatedly wound in a specified pattern through the slots 108 of the core sections 102A, 102B. This is preferably performed before the core sections 102A, 102B are joined. Preferably, two core windings 104 are wound onto each core section 102A, 102B, though it is appreciated that one, three, or more core windings 104 could alternatively be disposed on each core section.

Figure 4:
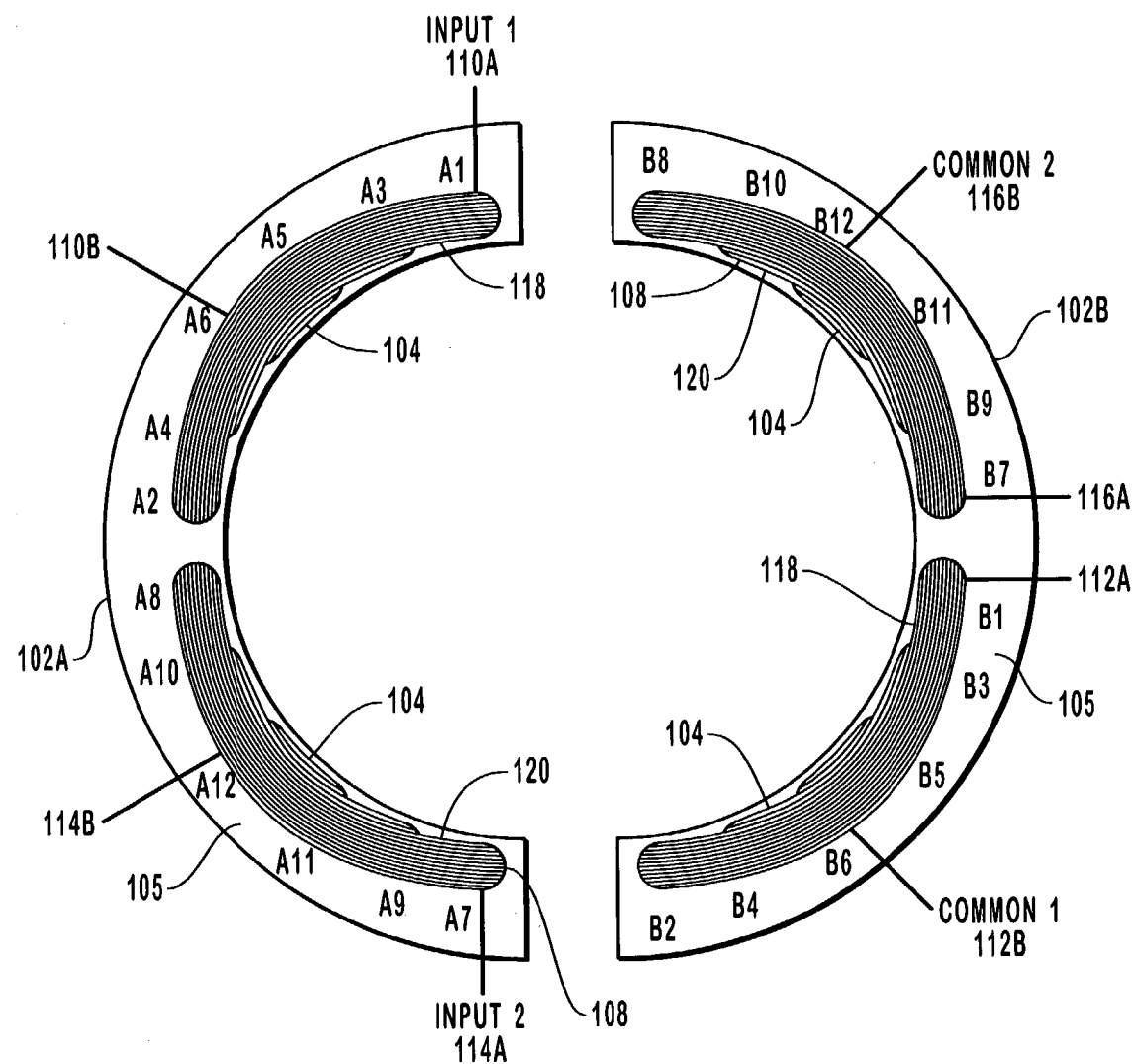
FIG. 4 is a top exploded view of various features of the composite stator in accordance with the first embodiment.

Reference is now made to FIG. 4. To construct the core windings 104, a length of conductive wire 110 is first introduced into an end of slot A6 on the core section 102A. The final end 110B of the wire 110 is left free outside the slot A6. The wire 110 is fed through slot A6 until it exits the other end. The wire 110 is then fed through slot A5 in core section 102A in similar fashion and returned to slot A1, thus forming a continuous loop of conductive wire extending through and between slots A6, A5 of the core section 102A. The wire 110 is long enough to repeat this looping procedure a given number of iterations. For example, in the first embodiment an enamel coated wire 110 having a diameter of approximately 0.015 inches is repeatedly wound through slots A6, A5 to form about 108 continuous wire loops.

Upon completing the continuous loops between slots A6 and A5, the wire 110 is then repeatedly wound between slots A3 and A4 to form 108 continuous wire loops therebetween. Finally, the wire 110 is repeatedly wound between slots A2 and A1 to form a third set of 108 continuous wire loops. A second end 110A of the wire 110 is left free outside an end of slot A1. In this configuration the wire 110 comprises a core winding 104 disposed on the core section 102A.

Wires 112, 114, and 116 are wound as described above through the slots B1–B6, A7–A12, and B7–B12, respectively, to form additional core windings on the core sections 102A and 102B as shown in FIG. 4. The wires have free ends 110A and 110B, 112A and 112B, 114A and 114B, and 116A and 116B, respectively, extending from each core winding 104. Thus, in the first embodiment of the composite stator 100, four core windings 104 are disposed on the core 102, two on each core section 102A, 102B. It is noted that each core winding 104 extends beyond the top faces 105 and the bottom faces 107 of the core sections 102A and 102B, and that the core windings conform to the curvature of those faces, as is typical of stator design.

It is appreciated that the diameter of the wires 110, 112, 114, and 116, as well as the number of loops comprising the core windings 104 may be varied by one of skill in the art in accordance with the intended use of the composite stator 100. The wires 110, 112, 114, and 116, instead of comprising one continuous wire each, may instead comprise several discrete wire sections that are electrically connected to one another to form a core winding 104. Accordingly, the above description is not meant to limit the scope of the present invention in any way.

Figure 5:
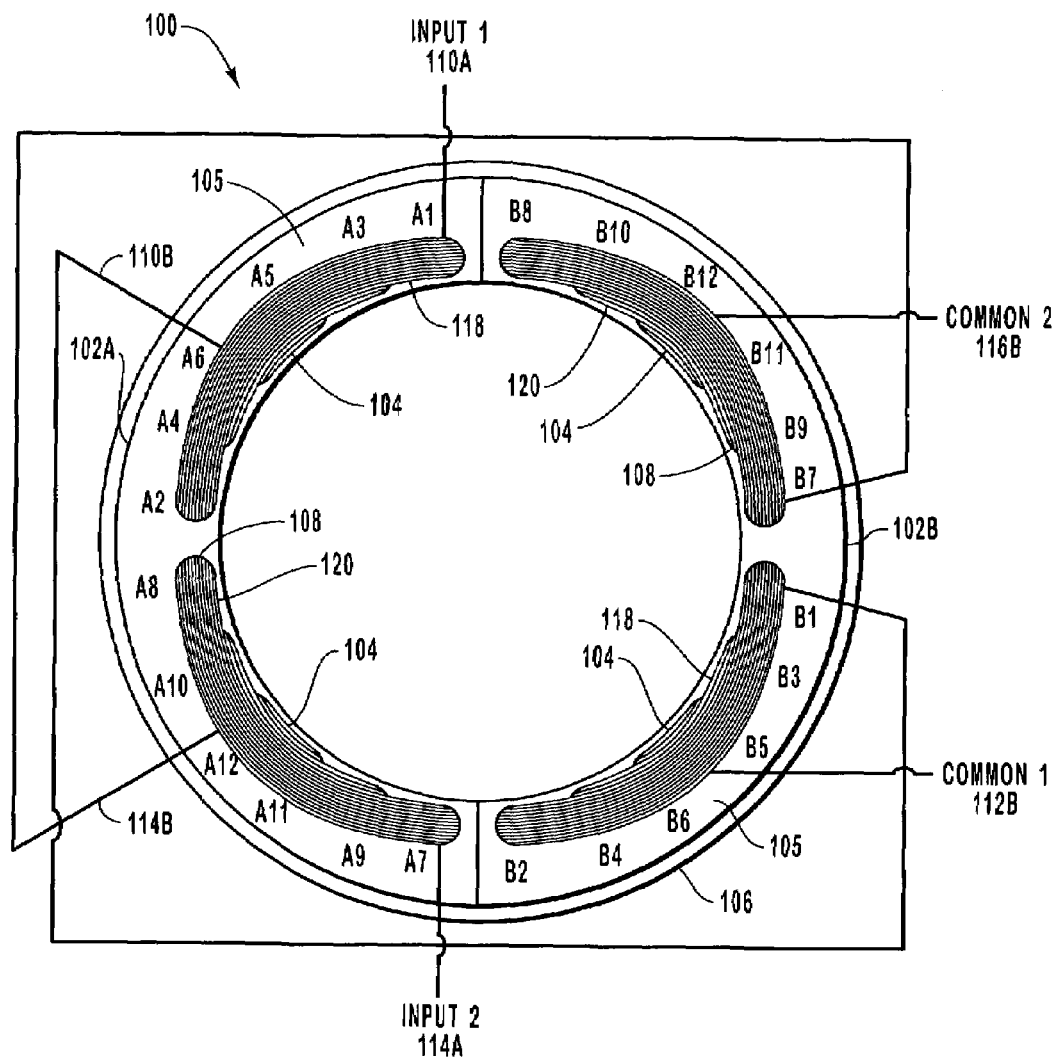
FIG. 5 is a top view of the composite stator of FIG. 2, showing various features thereof.

Reference is now made to FIG. 5, which depicts a top view of the composite stator 100 shown in FIG. 2. The figure shows the composite stator having each of the discrete core windings 104 wound onto one of the core sections 102A, 102B, and the core sections joined and secured together, preferably via a retaining band 106, though other mechanical fasteners could be used as well. The core sections join in a manner to minimize magnetic reluctance, for example, by flat ground or polished surfaces or by conductive material application or by interleaving laminations, or any combination of the above. The retaining band 106 should comprise a non-magnetic material so as not to interfere with the electromagnetic fields created by the composite stator 100 during operation of the x-ray tube 20.

Once the core sections 102A and 102B have been joined and fastened, the core windings 104 are interconnected to form two pairs of north-south electromagnetic poles. Preferably, the wire end 110B is connected to the wire end 112A, thereby electrically connecting the core windings 104 through slots A1–A6 and slots B1–B6, respectively. The wire ends 110A and 112B are electrically connected to one phase of a dual phase power source to complete the electrical circuit, thus forming a first electromagnetic pole pair winding 118. Similarly, the wire end 114B is connected to the wire end 116A, while the wire ends 114A and 116B are electrically connected to a second phase of a dual phase power source, thereby forming a second electromagnetic pole pair winding 120. The wire connection scheme depicted in FIG. 5 is for purposes of illustration and clarity only. As such, it is noted that the wire ends described above are integrated into the core windings 104 after being connected so as not to reside away from the body of the composite stator 100.

In the assembled configuration as shown in FIG. 5, the composite stator 100 comprises a four-pole electromagnetic induction stator that operates in a manner similar to known stators. For example, when connected to a dual phase power source operating at a frequency of 60 hertz, the composite stator 100 of FIG. 5 is able to rotate the anode 34 of the x-ray tube 20 at a rate of about 3,600 rpm, similar to a known single piece stator.

One skilled in the art will appreciate that the composite stator 100 may be configured to include more pole pair windings, or to operate with a three or more phase power supply. For instance, a two, six, or eight pole composite stator could be readily manufactured employing the features of the present embodiment discussed herein. Accordingly, such variations are understood to fall within the present invention.

Figure 6:
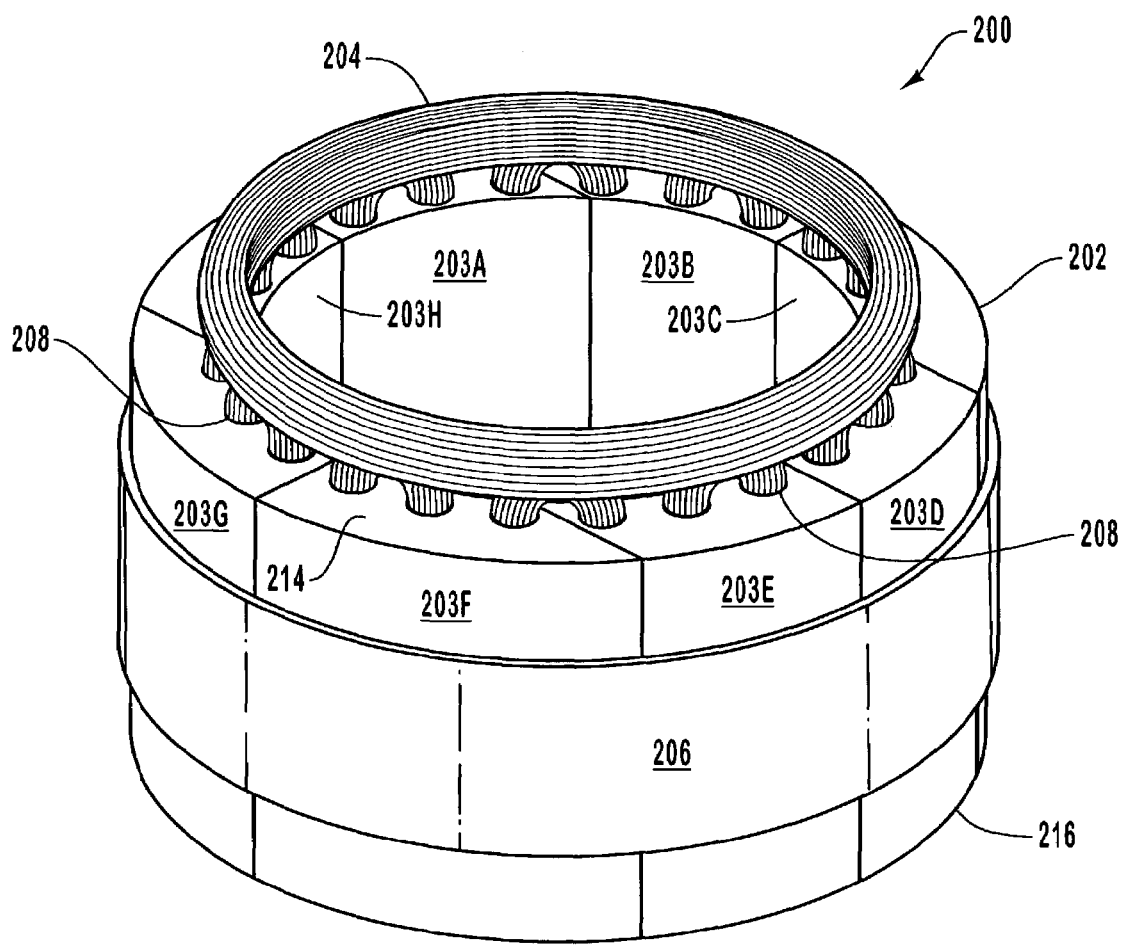
FIG. 6 is a perspective view of the composite stator in accordance with a second embodiment thereof.
Figure 7:
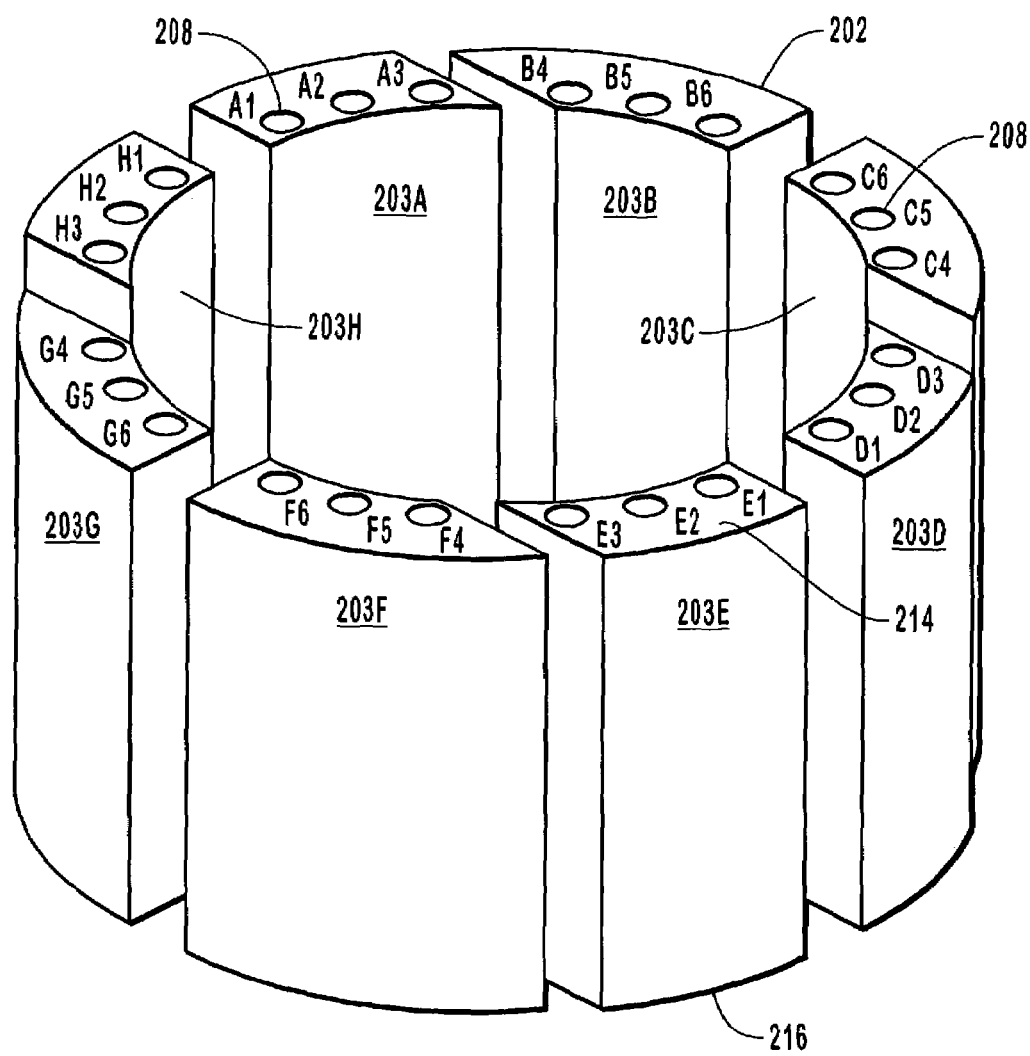
FIG. 7 is an exploded perspective view of the composite stator core in accordance with the second embodiment.
Figure 8:
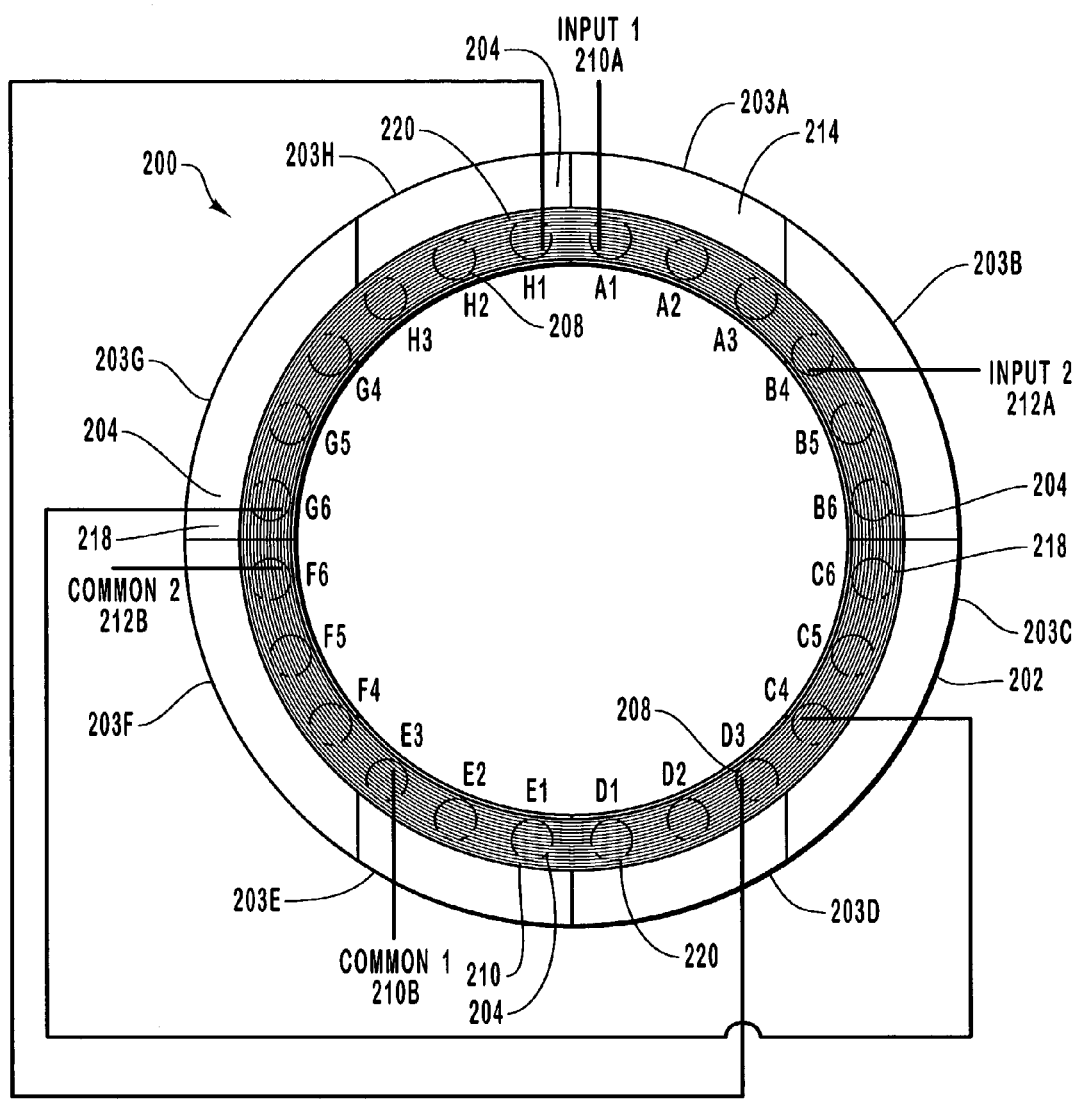
FIG. 8 is a top view of the composite stator of FIG. 6, showing various features thereof.

FIGS. 6–8 depict a second embodiment of the composite stator 100. To the extent that features of the first and second embodiments are identical, they will not be addressed again in depth. Thus, only selected features of the second embodiment of the composite stator 100 are discussed below.

Reference is made to FIGS. 6 and 7, which depict features of a second embodiment of the composite stator 100. The composite stator 100 of the present embodiment generally comprises a core 202 preferably comprising steel, a plurality of core windings 204, and a retaining band 206. The core 202 of the second embodiment comprises eight core sections 203A, 203B, 203C, 203D, 203E, 203F, 203G, and 203H that together define its hollow cylindrical shape. As before, the core sections 203 are held together after assembly by a fastener such as a retaining band 206.

The eight core sections 203A–203H are seen in exploded view in FIG. 7. Each core section 203A–203H comprises a longitudinally extending section of the core 202. One skilled in the art will appreciate that the core 202 of the composite stator 100 may comprise few or many longitudinally extending sections depending upon the intended use of the stator. For example, the core 202 could comprise four, six, or even ten core sections. Or, the various core sections could vary in relative size one to another. These and other similar configurations are therefore understood to reside within the present invention.

Each of the core sections 203A–203H has longitudinally defined therethrough three slots 208 for receiving the core windings 204. The slots 208 in FIG. 7 are designated with letter/number identifiers to facilitate description of the wiring scheme used to dispose the core windings 204 about the stator core 202. It is noted that in other embodiments of the present composite stator, which may comprise different numbers of core sections, the number of slots disposed though each core sections may vary according to the size of the core section and the design of the core windings wound through the slots. Moreover, the number of slots defined on each core section could vary with respect to the other core sections of the composite stator, if desired.

As best seen in FIG. 8, preferably four core windings 204 are wound onto the core 202. To wind the core windings 204, the core sections 203A–203H are first joined together in a temporary arrangement to form the stator core 202. In a manner similar to that described above in connection with the first embodiment, a conductive wire 210 is repeatedly wound through slots A1 and D1 to form a continuous series of wire loops therebetween. The portions of the wire 210 that extend between the respective slots A1 and D1 are shaped such that they are disposed along the curved top and bottom faces 214 and 218 of the stator core. Preferably, 108 loops of the wire 210 having a diameter of 0.015 inch are wound through and between slots A1 and D1.

The wire 210 is then continuously wound between slots A2 and D2 in a similar manner to that described above. The process is continued through A3 and D3, whereupon a continuous core winding 204 comprising successive loops of the wire 210 from slot A1 to slot D3 is formed. At this point, the ends 210A and 210B of the wire 210 are disposed outside the slots A1 and D3, respectively.

The end 210B of the wire 210 is directed to slot H1 where a new core winding 204 is begun between slots H1 and E1 by forming successive loops between the two slots in the manner described above. Similarly, the wire 210 is then wound through and between slots H2 and E2, then slots H3 and E3. In this way, a second continuous core winding 204 extending from slot H1 to E3 is formed. The end 210B of wire 210 now resides outside the slot E3, while the other end 210A remains disposed outside the slot A1. These ends, when connected to one phase of a dual phase power source will enable the two core windings 204 formed by the wire 210 to function as a first electromagnetic pole pair winding 218 within the composite stator 100, as seen in FIG. 8.

Preferably, two more core windings 204 are created on the stator core 202 by winding a second conductive wire 212 first through and between slots B4 and G4, B5 and G5, and B6 and G6 in a manner similar to that described above in connection with the winding of the wire 210. The wire 212 is then directed to and wound through and between slots C4 and F4, C5 and F5, and C6 and F6. In this way, wire 212 is wound to create two core windings 204 on the core 202. One end 212A is disposed outside slot B4, while the other end 212B is disposed outside slot F6. As before, the ends 212A and 212B are connected to a second phase of a dual phase power source, thereby enabling the two core windings 204 formed by the wire 212 to function as a second electromagnetic pole pair winding 220 within the composite stator 100, as seen in FIG. 8. As mentioned above, the composite stator 100 could comprise a different number of motor windings than what is described herein, according to the intended use of the composite stator 100.

Once the winding of the core windings 204 is complete, the core sections 203A–203H are disassembled so that they may be disposed about the rotor sleeve or other rotational component in the apparatus in which the composite stator 100 will function before being permanently assembled. The high power, double-ended x-ray tube 20 such as is depicted in FIG. 1 is one example of an apparatus in which the composite stator 100 of the present invention could be disposed. As mentioned above, however, use of the present composite stator 100 is not limited to x-ray tubes. Various apparatus utilizing known stators could also benefit from incorporation of the composite stator as shown and described herein.

To disassemble the core sections 203A–203H, the wire 210 is cut between slots D3 and H1. Similarly, the wire 212 is cut between slots G6 and C4. With these wires cut, the retaining band 206 may be removed and the various core sections 203A–203H may be separated one from another. They may then be disposed in their respective positions within the apparatus in which the composite stator 100 will function. As depicted in FIG. 1, the apparatus may comprise the x-ray tube 20, wherein the composite stator 100 is to be disposed about the upper portion 28A of the bottom section 28 of the vacuum enclosure 22. Once the core sections 203A–203H are disposed about the upper portion 28A, they are again joined together and secured by the retaining band 206 to form the core 202. Wires 210 and 212 are then reconnected between slots D3 and H1, G6 and C4, respectively. Wire ends 210A and 210B, 212A and 212B are then electrically connected with respective phases of a dual-phase power supply to enable the first and second electromagnetic pole pair windings 218 and 220 to operate when the composite stator 100 is energized during tube operation. In this assembled configuration, the composite stator 100 comprises a four pole induction stator, able, for example, to rotate the anode 34 of the x-ray tube 20 at a rate of 3,600 rpm during tube operation.

Though the above describes one wiring configuration for creating electromagnetic pole pair windings on the stator core, other wiring configurations are also contemplated by the present invention. The above wiring configuration, therefore, is not to be considered as limiting the present invention in any way.

The composite stator 100 of the present invention is advantageously utilized in high power, double-ended x-ray tubes. In such x-ray tubes, the anode insulating disk 30 is by necessity sufficiently large so as to prevent typical one-piece stators from sliding over the disk. In contrast, the composite stator 100 is not slid over the insulating disk 30 as known stators are, but rather is disposed piece-by-piece about the portion of the vacuum enclosure 22 proximate the rotor sleeve 50 before being joined together to form the composite stator. Thus, the inside diameter of the composite stator core 102, 202 is not limited by the size of the anode insulating disk 30. This in turn allows the inside diameter of the composite stator core 102, 202 to be minimized, which correspondingly minimizes the distance between the stator core and the rotor sleeve 50 of the x-ray tube 20.

The ability of the composite stator 100 to be proximately disposed with respect to the rotor sleeve 50 of the x-ray tube 20 enables the design the x-ray tube to be modified in order to improve its performance. First, the rotor sleeve 50 need not be altered to have a greater outside diameter in order to inductively couple with a one-piece stator having a larger then desired inside diameter. Thus, a standard-size rotor sleeve commonly employed in other x-ray tubes may be used in the high power x-ray tube 20, which saves the manufacturing time and expense involved in specially producing an enlarged rotor sleeve.

Second, the aperture 26 defined between the top section 24 and the bottom section 28 of the vacuum enclosure 22 may be reduced as a result of a smaller rotor sleeve 50 being disposed within the vacuum enclosure. Because a steady stream of radiative heat energy is undesirably transmitted from the anode 34 to the rotor assembly 43 through the aperture 26 during tube operation, the reduction in size of the aperture assists in preventing excessive heating of thermally sensitive components of the rotor assembly, such as the bearing assembly 48.

Last, the composite stator 100 of the present invention is smaller than known one-piece stators utilized in high power x-ray tubes. The smaller size of the composite stator 100 makes it lighter, which is an important consideration in x-ray tube design. Moreover, and given its size, the composite stator 100 frees up more space about the vacuum enclosure 22, which enables more effective movement of cooling air provided by the x-ray tube cooling system (not shown). This results in better cooling of the composite stator 100 and the vacuum enclosure 22.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

The invention claimed is:

1. An x-ray tube, comprising:
   a cathode for producing electrons;
   an anode positioned to receive electrons emitted by the cathode;
   a vacuum enclosure in which the cathode and the anode are disposed the vacuum enclosure comprising:
      a top section;
      a bottom section, the bottom section defining a first portion and a second portion, wherein a cross-sectional dimension of the first portion is less than the second portion; and
      an insulating portion disposed adjacent to the second portion of the bottom section; and
   a hollow stator core disposed about the first portion disposed about the bottom section, the stator core comprising:
      a plurality of separable core sections, wherein each core section comprises a longitudinally extending portion of the hollow stator core, and each of the separable core sections substantially comprises a single piece of material; and
      longitudinally extending slots defined through the core sections; and
   a plurality of core windings comprising loops of electrically conductive wire, wherein at least a portion of the loops are received into at least two of the longitudinally extending slots.

2. A composite stator as defined in claim 1, wherein each of the core windings is received into at least one slot defined through each core section.

3. A composite stator as defined in claim 1, wherein the composite stator comprises at least two pairs of core windings, and wherein the core windings of each pair are electrically connected to comprise electromagnetic pole pairs.

4. A composite stator as defined in claim 3, wherein the composite stator comprises at least two electromagnetic pole pairs.

5. A composite stator as defined in claim 1, wherein the stator core comprises two core sections.

6. A composite stator as defined in claim 5, wherein each core section includes 12 longitudinally extending slots.

7. A composite stator as defined in claim 1, wherein the stator core comprises eight core sections.

8. A composite stator as defined in claim 7, wherein each core section includes three longitudinally extending slots.

9. A composite stator as defined in claim 1, further comprising a retaining band disposed about the outer periphery of the stator core.

10. The composite stator as recited in claim 1, wherein each of the plurality of separable core sections comprises a cast part.

11. The composite stator as recited in claim 1, wherein each of the plurality of separable core sections comprises a machined part.

12. The composite stator as recited in claim 1, wherein a first separable core section has a different geometry than a second separable core section.

13. The composite stator as recited in claim 1, wherein each of the longitudinally extending slots is defined by a single corresponding core section.

14. An x-ray tube, comprising:
    a cathode for producing electrons;
    an anode positioned to receive electrons emitted by the cathode;
    a vacuum enclosure in which the cathode and the anode are disposed, comprising:
       a substantially cylindrical top section;
       a substantially cylindrical bottom section defining a first portion and a second portion, wherein the diameter of the first portion is less than the second portion;
       an insulating disk attached to the second portion of the substantially cylindrical bottom section; and
    a composite stator disposed about the first portion of the substantially cylindrical bottom section, the composite stator comprising:
       a hollow cylindrical stator core comprising:
          a plurality of separable core sections, wherein each core section comprises a longitudinally extending portion of the hollow cylindrical stator core; and
          longitudinally extending slots defined through the core sections; and
       a plurality of core windings comprising loops of electrically conductive wire, wherein at least a portion of the loops are received into at least two of the longitudinally extending slots.

15. An x-ray tube as defined in claim 14, wherein each of the core windings is received into at least one slot defined through each core section.

16. An x-ray tube as defined in claim 14, wherein the composite stator comprises at least two pairs of core windings, and wherein the core windings of each pair are electrically connected to comprise electromagnetic pole pairs.

17. An x-ray tube as defined in claim 16, wherein the composite stator comprises at least two electromagnetic pole pairs.

18. An x-ray tube as defined in claim 14, wherein the stator core comprises two core suctions.

19. An x-ray tube as defined in claim 18, wherein each core section includes 12 longitudinally extending slots.

20. An x-ray tube as defined in claim 14, wherein the stator core comprises eight core sections.

21. An x-ray tube as defined in claim 20, wherein each core section includes three longitudinally extending slots.

22. An x-ray tube as defined in claim 14, further comprising a retaining band disposed about the outer periphery of the stator core.

23. An x-ray device, comprising:
    a cathode;

an anode positioned to receive electrons emitted by the cathode;

a vacuum enclosure in which the cathode and the anode are disposed, the vacuum enclosure comprising:
 a top section; and
 a bottom section attached to the top section and defining first and second portions, a diameter of the first portion being less than a diameter of the second portion;

a rotor at least partially disposed within the first portion and connected at least indirectly to the anode; and a stator disposed about the first portion and comprising:
 a stator core, comprising:
  a plurality of core sections, each of which comprises a longitudinally extending portion of the stator core, and each core section defining at least a portion of a longitudinally extending slot; and
  a retaining band disposed about the plurality of core sections; and
 at least one core winding passing through at least two of the longitudinally extending slots.

24. The x-ray device as recited in claim 23, wherein each of the plurality of core sections comprises a cast part.

25. The x-ray device as recited in claim 23, wherein each of the plurality of core sections comprises a machined part.

26. The x-ray device as recited in claim 23, wherein a first core section has a different geometry than a second core section.

27. The x-ray device as recited in claim 23, wherein at least two of the core sections have substantially the same geometry.

28. The x-ray device as recited in claim 23, wherein each of the core sections substantially comprises a single piece of material.

29. The x-ray device as recited in claim 23, wherein the stator core has an inside diameter less than the diameter of the second portion of the bottom section of the vacuum enclosure.

30. The x-ray device as recited in claim 23, wherein each of the core sections is separable from the other core sections.

* * * * *